(12) United States Patent
Mathias et al.

(10) Patent No.: US 11,207,815 B2
(45) Date of Patent: Dec. 28, 2021

(54) METHOD OF MANUFACTURING A BEVERAGE CARTRIDGE

(71) Applicant: SharkNinja Operating LLC, Needham, MA (US)

(72) Inventors: Richard Rhys Mathias, Brookline, MA (US); Scott James Stewart, Boston, MA (US); William Langr Close, Gloversville, NY (US)

(73) Assignee: Sharkninja Operating LLC, Needham, MA (US)

( * ) Notice: Subject to any disclaimer, the term of this patent is extended or adjusted under 35 U.S.C. 154(b) by 176 days.

(21) Appl. No.: 16/434,149

(22) Filed: Jun. 6, 2019

(65) Prior Publication Data

US 2019/0375143 A1 Dec. 12, 2019

Related U.S. Application Data

(60) Provisional application No. 62/683,681, filed on Jun. 12, 2018.

(51) Int. Cl.
| | |
|---|---|
| *B29C 48/21* | (2019.01) |
| *B29C 48/09* | (2019.01) |
| *B29C 48/13* | (2019.01) |
| *B29C 69/02* | (2006.01) |
| *B65B 1/02* | (2006.01) |
| *B65B 43/00* | (2006.01) |
| *B65D 85/804* | (2006.01) |
| *B29C 67/00* | (2017.01) |
| *B29L 31/00* | (2006.01) |

(52) U.S. Cl.
CPC ............. *B29C 48/21* (2019.02); *B29C 48/09* (2019.02); *B29C 48/13* (2019.02); *B29C 67/0014* (2013.01); *B29C 69/02* (2013.01); *B65B 1/02* (2013.01); *B65B 43/00* (2013.01); *B65D 85/8043* (2013.01); *B29L 2031/7174* (2013.01)

(58) Field of Classification Search
CPC ..... B65D 85/8043; B29C 48/21; B29C 48/09; B29C 48/13; B29C 69/02; B29C 67/0014; B29C 48/0011; B29C 48/0022; B65L 1/02; B65L 29/022; B65B 43/00; B65B 1/02; B65B 29/022; B29L 2031/7174; A47J 31/44
See application file for complete search history.

(56) References Cited

U.S. PATENT DOCUMENTS

| | | | |
|---|---|---|---|
| 4,741,936 A * | 5/1988 | Nohara | B29C 48/3366 428/36.7 |
| 5,460,771 A | 10/1995 | Mitchell et al. | |
| 2003/0160356 A1* | 8/2003 | D'Angelo | B29C 48/303 264/150 |
| 2012/0121768 A1* | 5/2012 | Lai | A47J 31/3623 426/231 |
| 2015/0259134 A1* | 9/2015 | Mack | B65D 65/466 426/112 |
| 2020/0262693 A1* | 8/2020 | Stefanoni | B65B 29/022 |

* cited by examiner

*Primary Examiner* — Leith S Shafi
*Assistant Examiner* — Inja Song
(74) *Attorney, Agent, or Firm* — Mintz Levin Cohn Ferris Glovsky and Popeo, PC; Lisa Adams

(57) ABSTRACT

A method of manufacturing a cartridge body for use in a cartridge associated with a beverage preparation system includes extruding a tubular structure, forming the tubular structure into a desired shape, and cutting the tubular structure at intervals to separate the tubular structure into individual cartridge bodies.

20 Claims, 7 Drawing Sheets

METHOD OF MANUFACTURING A BEVERAGE CARTRIDGE

CROSS-REFERENCE TO RELATED APPLICATIONS

This application claims the benefit of U.S. Provisional Application Ser. No. 62/683,681, filed Jun. 12, 2018, which is incorporated herein by reference in its entirety.

BACKGROUND

Exemplary embodiments of the present disclosure relate to a cartridge for the preparation of a beverage such as in a beverage producing system, and more particularly, to a method for manufacturing a cartridge body of a cartridge usable in a beverage producing system.

Beverage producing systems have been developed on the basis of portioned beverages, in particular, cartridges containing a predetermined dose of beverage ingredient such as coffee, tea, milk powder and the like. The advantages of such systems have been widely recognized. In particular, beverage producing systems using prepackaged cartridges are convenient to use, perform clean operations, and provide enhanced quality control of the brewed beverage delivered. Because of these advantages, cartridges are being launched onto the market in by several manufacturers and in abundant variety.

SUMMARY

According to one embodiment, a method of manufacturing a cartridge body for use in a cartridge associated with a beverage preparation system includes extruding a tubular structure, forming the tubular structure into a desired shape, and cutting the tubular structure at intervals to separate the tubular structure into individual cartridge bodies.

In addition to one or more of the features described above, or as an alternative, in further embodiments the extruding said tubular structure includes coextruding a composition including a plurality of layers.

In addition to one or more of the features described above, or as an alternative, in further embodiments at least one of said plurality of layers includes a material for achieving a desired shelf life of a flavorant to be stored within the cartridge body.

In addition to one or more of the features described above, or as an alternative, in further embodiments said plurality of stacked layers include an inner layer, an intermediate layer and an outer layer.

In addition to one or more of the features described above, or as an alternative, in further embodiments an adhesive material is positioned between adjacent layers of said plurality of stacked layers.

In addition to one or more of the features described above, or as an alternative, in further embodiments forming said tubular structure into said desired shape further comprises supplying said tubular structure to a corrugator.

In addition to one or more of the features described above, or as an alternative, in further embodiments said desired shape includes a contour associated with a plurality of cartridge bodies.

In addition to one or more of the features described above, or as an alternative, in further embodiments said plurality of cartridge bodies further comprises a substantially identical first cartridge body and second cartridge body, wherein said desired shape associated with said plurality of cartridge bodies includes a first end of said first cartridge body being arranged a distinct first end of a second cartridge body.

In addition to one or more of the features described above, or as an alternative, in further embodiments said plurality of cartridge bodies further comprises a substantially identical first cartridge body and second cartridge body, wherein said desired shape associated with said plurality of cartridge bodies includes a first end of said first cartridge body being arranged a similar first end of a second cartridge body.

In addition to one or more of the features described above, or as an alternative, in further embodiments cutting said tubular structure at intervals includes supplying said tubular structure to at least one cutting mechanism.

In addition to one or more of the features described above, or as an alternative, in further embodiments cutting said tubular structure at intervals further comprises removing excess material to form a finished cartridge body.

In addition to one or more of the features described above, or as an alternative, in further embodiments each of said individual cartridge bodies has a first open end and a second open end.

In addition to one or more of the features described above, or as an alternative, in further embodiments said tubular structure is continuously output from said extruder is continuously formed into said desired shape.

In addition to one or more of the features described above, or as an alternative, in further embodiments the method of manufacturing a cartridge body is a continuous process.

According to another embodiment, a method of manufacturing a cartridge for use in a beverage preparation system, the method includes forming a cartridge body having a first end, a second end, and at least one side wall extending between said first end and said second end to define a hollow interior. The first end and the second end of said cartridge body are open. A flavorant is positioned within said hollow interior.

In addition to one or more of the features described above, or as an alternative, in further embodiments forming said cartridge body further comprises coextruding a plurality of layered materials as a tubular structure.

In addition to one or more of the features described above, or as an alternative, in further embodiments forming said cartridge body further comprises forming said tubular structure into a desired shape.

In addition to one or more of the features described above, or as an alternative, in further embodiments forming said tubular structure into a desired shape further comprises supplying said tubular structure to a corrugator.

In addition to one or more of the features described above, or as an alternative, in further embodiments said desired shape includes a plurality of integrally formed cartridge bodies.

In addition to one or more of the features described above, or as an alternative, in further embodiments comprising connecting a first filter to said cartridge body adjacent one of said first end and said second end and attaching a second filter to said cartridge body adjacent another of said first end and said second end.

In addition to one or more of the features described above, or as an alternative, in further embodiments comprising affixing a flexible membrane to at least one of said first end and said second end.

According to another embodiment, a cartridge for use with a beverage brewing system to prepare a brewed beverage, the cartridge including a cartridge body having an open first end, an open second end, and at least one sidewall extending between said first end and said second end to define a hollow interior. The cartridge body being formed by extruding a tubular structure, forming the tubular structure into a desired shape, and cutting the tubular structure at intervals to separate the tubular structure into individual cartridge bodies.

In addition to one or more of the features described above, or as an alternative, in further embodiments comprising a first filter connected to said first end of said cartridge body, a second filter connected to said second end of said cartridge body, and a flavorant arranged within said hollow interior between said first filter and said second filter.

In addition to one or more of the features described above, or as an alternative, in further embodiments comprising a first flexible membrane coupled to said first end of said cartridge body, said first flexible membrane being arranged in overlapping relationship with said first filter.

In addition to one or more of the features described above, or as an alternative, in further embodiments comprising a second flexible membrane coupled to said second end of said cartridge body, said second flexible membrane being arranged in overlapping relationship with said second filter.

In addition to one or more of the features described above, or as an alternative, in further embodiments said cartridge body is formed from a multi-layer composition, said multi-layer composition being coextruded.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

Figure 1:
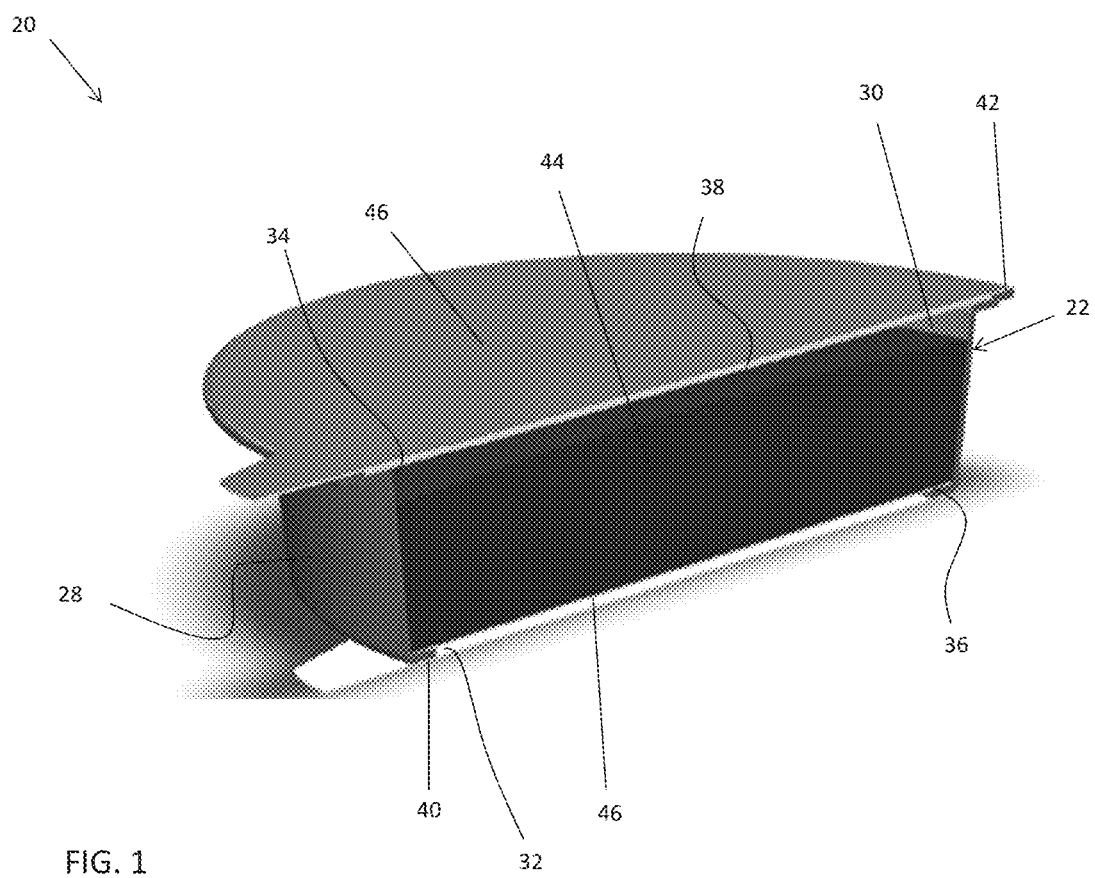
FIG. 1 is a perspective view of a cross-section of a cartridge for use with a beverage brewing system according to an embodiment.
Figure 2:
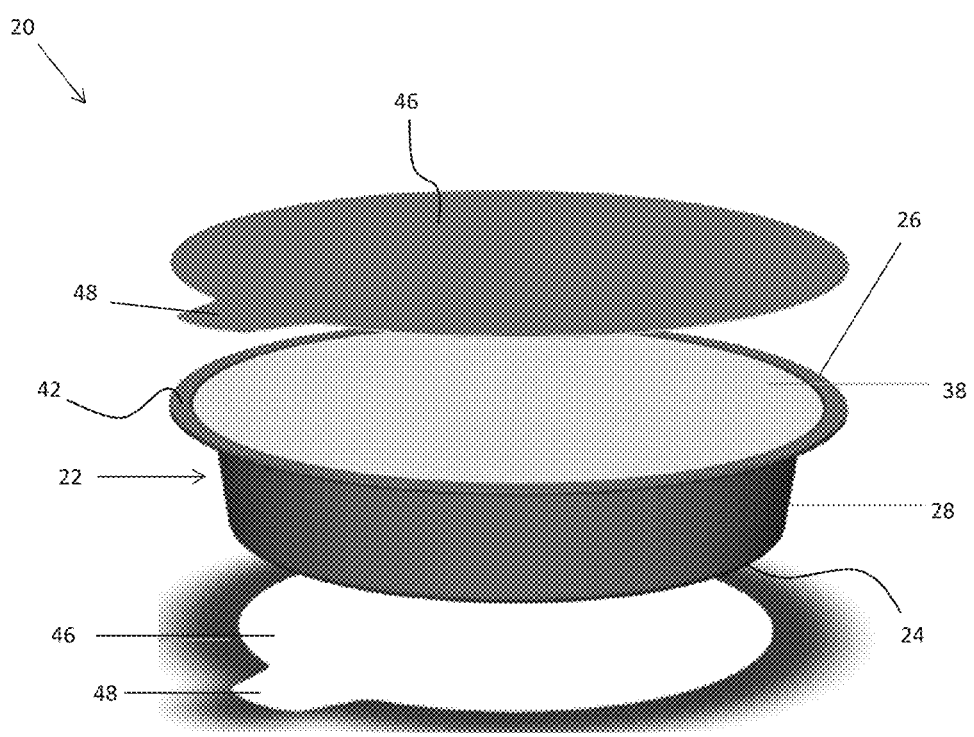
FIG. 2 is an exploded view of a cartridge for use with a beverage brewing system according to an embodiment.

The detailed description explains embodiments of the disclosure, together with advantages and features, by way of example with reference to the drawings.

DETAILED DESCRIPTION

Referring now to the FIGS. 1-4, an example of a cartridge 20 for use in preparing a brewed beverage is illustrated. In the context of this disclosure, the term "cartridge" is used to encompass any capsule, pod, sachet, wrapper or other container or case containing a material suitable for use with a beverage brewing system. As shown, the cartridge 20 includes a cartridge shell or body 22 having a first end 24 and a second opposite end 26, such as a top and bottom, respectively, best shown in FIGS. 3 and 4. One or more sidewalls 28 extend between the first and second ends 24, 26 of the body 22 to define a hollow interior 30 of the body 22.

In an embodiment, the cartridge body 22 is formed from a rigid or semi-rigid material, such as plastic for example. In the illustrated, non-limiting embodiment, the cartridge body 22 is generally frustoconical in shape and has a circular cross-section. As shown, a diameter of the body 22 adjacent the first end 24 is smaller than a diameter of the body 22 adjacent the second end 26. However, it should be understood that a cartridge body 22 having any shape is contemplated herein.

Unlike conventional cartridges 20, an opening 32, 34 is formed in both the first end 24 and the second end 26 of the cartridge body 22, respectively. In an embodiment, the diameter of the first opening 32 is similar to a diameter of the hollow interior 30 adjacent the first end 24 and the diameter of the second opening 34 is similar to the diameter of the hollow interior 30 adjacent the second end 26. However, it should be understood that embodiments where the openings 32, 34 are any size are contemplated herein.

Figure 3:
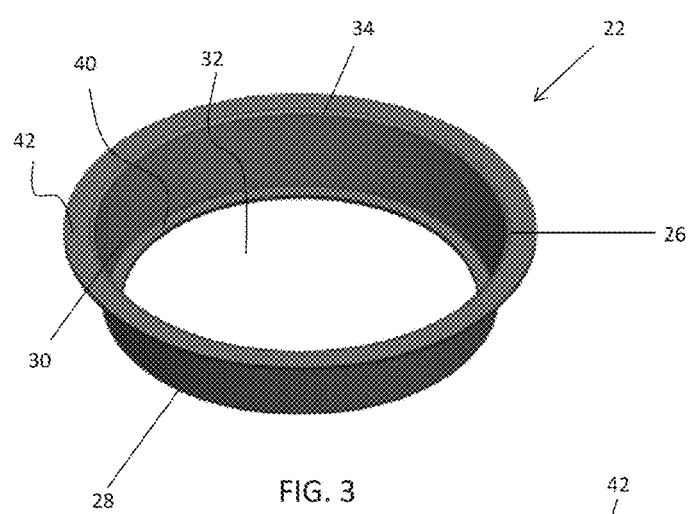
FIG. 3 is a perspective view of a cartridge body of a cartridge for use with a beverage brewing system according to an embodiment.
Figure 4:
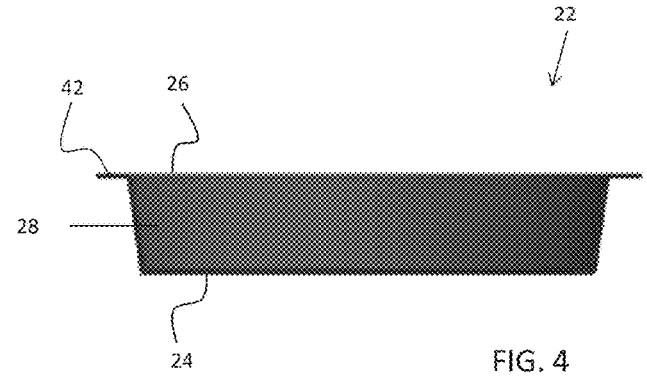
FIG. 4 is a side view of the cartridge body of FIG. 3 according to an embodiment.

The cartridge 20 additionally includes a first filter 36 attached to the body 22 adjacent the first end 24 and a second filter 38 connected to the body 22 adjacent the second end 26. For example, the first filter 36 may be arranged within the plane defined by the first end 24 and the second filter 38 may be arranged within the plane defined by the second end 26. In the illustrated, non-limiting embodiment, the first filter 36 is mounted, such as via an adhesive or a heat seal for example, to a flange 40 formed at the first end 24 of the body 22. As best shown in FIG. 3, the flange 40 is arranged within the plane defined by the first end 24 and extends inwardly into the hollow interior 30 of the body 22 such that the diameter of the first opening 32 is defined by the flange 40. In an embodiment, another flange 42 may be formed at the second end 26 of the body 22. The flange 42 at the second end 26 of the body 22 may extend about the periphery of the body 22 in an outward direction. In the illustrated, non-limited embodiment, the flange 42 is stepped (see FIG. 1) such that flange 42 has a first portion having a first diameter and a second portion, offset from the first portion, having a second diameter. As shown, the second filter 38 may be connected to the first portion of the flange 42. In such embodiments, the second filter 38 has a diameter generally equal to a first portion of the flange 42.

The first and second filters 36, 38 seal the ends 24, 26 of the hollow interior 30 of the body 22 to define a chamber therein. As shown in the cross-sectional view of the cartridge 20 in FIG. 1, the chamber of the hollow interior 30 is at least partially filled with a food product or flavorant 44, such as coffee grinds or tea leaves for example. The flavorant 44 may be loosely arranged within the hollow interior 30, or alternatively, may be compacted. In an embodiment, the material of the filters 36, 38 is selected to restrict movement of the flavorant 44 from the hollow interior 30, but to allow a fluid or liquid to pass there through.

A flexible membrane 46 may be mounted to at least one of the first end 24 and the second end 26 of the cartridge body 22 to form a barrier that protects the filters 36, 38 and/or flavorant 44 from contamination. Suitable materials for forming the flexible membrane 46 include, but are not limited to foil, polyethylene, oriented polyethylene terephthalate (OPET), oriented polyamide (OPA), and adhesive. In an embodiment, the flexible membrane 46 has a size and shape generally complementary to or slightly larger than a corresponding surface of the body 22 to which the membrane 46 is mounted. For example, a membrane 46 mounted to the first end 24 of the body 22 has a diameter generally equal to the outer diameter of the first end 24 of the body 22 and a membrane 46 mounted to the second end 26 of the body 22 has a diameter substantially equal to the outer diameter of the second portion of the flange 42. The flexible membrane 46 may be removed from the cartridge 20 by the user prior to insertion of the cartridge 20 into a brew chamber of a beverage brewing system. In an embodiment, the membrane 46 may include a feature 48, such as a tab or protrusion for example, that allows a user to easily grasp and apply a force to the flexible membrane 46 to separate the membrane 46 from the cartridge 20. The cartridge 20 illustrated and described herein is intended as an example only, and it should be understood by a person having ordinary skill in the art that any cartridge is within the scope of the disclosure.

Figure 5:
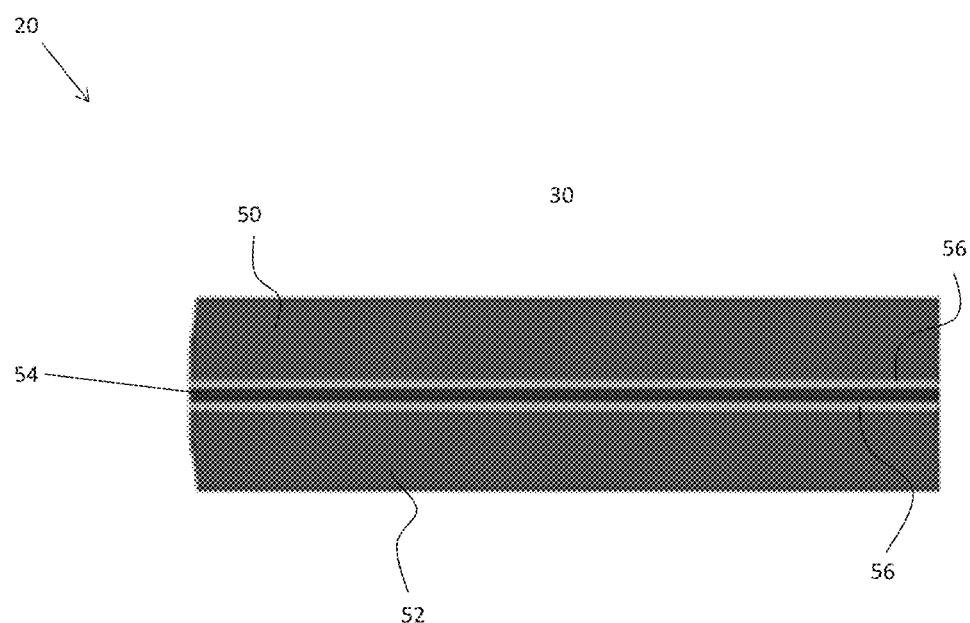
FIG. 5 is a cross-sectional view a sidewall of the cartridge body according to an embodiment.

With reference now to FIG. 5, a cross-sectional view of a sidewall 28 of the cartridge body 22 is illustrated. As shown, the cartridge body 22 includes multiple layers of material. In the illustrated, non-limiting embodiment, the cartridge body 22 includes an inner layer 50, and outer layer 52, and an intermediate layer 54 disposed between the inner and outer layers 50, 52. However, it should be understood that a cartridge body 22 formed from any number of layers, including a single layer, two layers, or more than three layers is contemplated herein. In embodiments including a plurality of layers, the layers 50, 52, 54 may consist of the same material, or alternatively, of different materials. In the embodiment shown in the FIG., the inner layer 50 and outer layer 52 are formed from a first material, such as a polypropylene for example, and the intermediate layer 54 is formed from a second material, such as ethylene vinyl alcohol for example. The use of ethylene vinyl alcohol or another suitable material is intended to form a barrier to achieve a desired shelf life of the flavorant 44. However, any materials suitable for use in a beverage cartridge application are within the scope of the disclosure. In an embodiment, an adhesive material 56, such as a resin for example, may be positioned between adjacent layers 50, 52, 54 to bind the layers together as a unitary body or composition.

Figure 6:
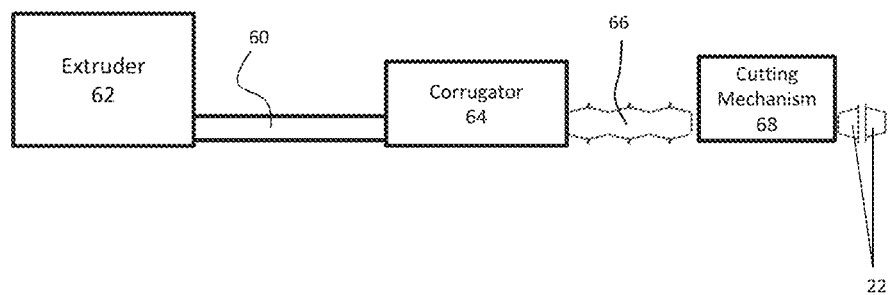
FIG. 6 is a schematic diagram of a system for manufacturing a cartridge body according to an embodiment.
Figure 7:
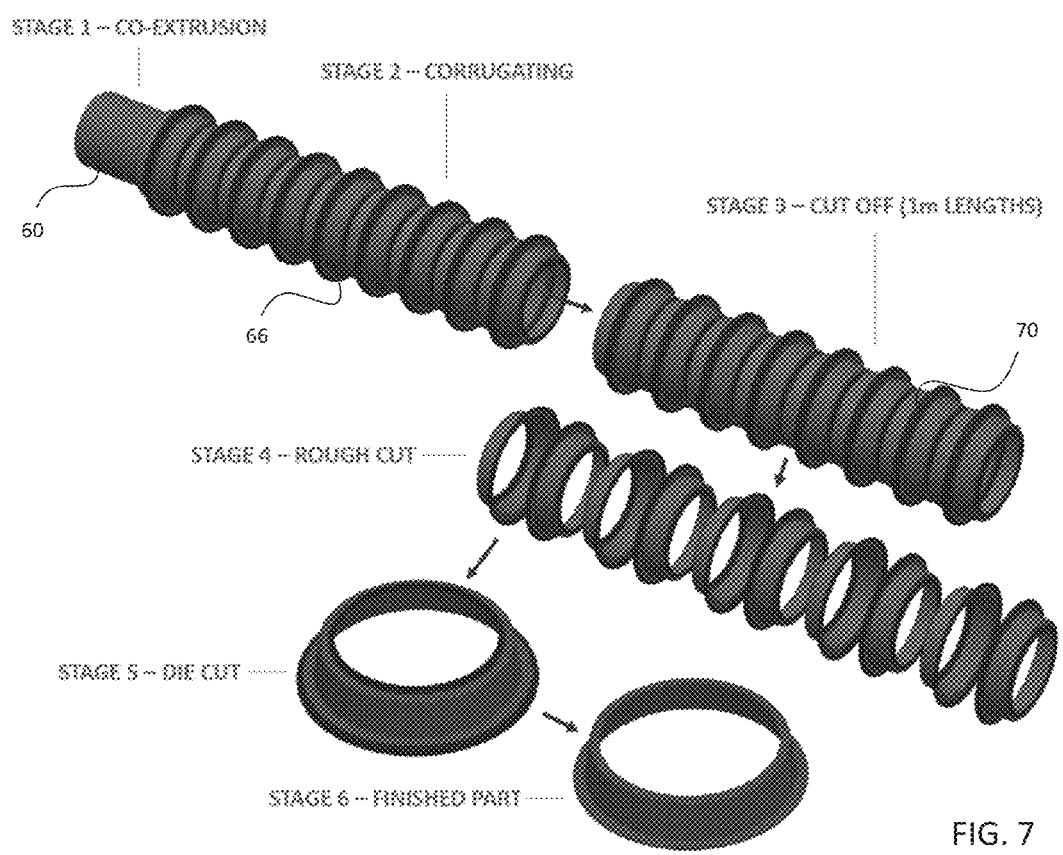
FIG. 7 is a flow diagram illustrated a process for manufacturing a cartridge body according to an embodiment.

Because the cartridge body 22 has a generally hollow interior 30 and openings 32, 34 formed in the ends 24, 26 thereof, in an embodiment, the cartridge body 22 may be manufactured via an extrusion process. With reference now to FIGS. 6 and 7, an example of a system and method of manufacturing a cartridge body 22 is illustrated. In embodiments where the cartridge body 22 has a multilayer composition, a hollow tubular structure, 60 having a plurality of layers stacked in a desired configuration is output from a die of an extruder 62. The tubular structure 60 output from the extruder 62 is then provided to a downstream corrugator 64. The tubular structure 60 may be continuously provided to the corrugator 64, or alternatively, the tubular structure 60 may be cut into pieces prior to being supplied to the corrugator 64.

Within the corrugator 64, the formable tubular structure 60 is formed into a desired shape, such as using mold blocks and the application of a vacuum for example. To maximize the efficiency of the manufacturing process, the desired shape of the tubular structure 60 formed within the corrugator 64 may be associated with a plurality of cartridge bodies 22. For example, in the illustrated, non-limiting embodiment, the contour applied to the extruded tubular structure 60 within the corrugator 64 is selected such that the first end 24 of a cartridge body 22 is generally arranged adjacent the first end 24 of another cartridge body 22, and the second end 26 of a cartridge body 22 abuts the second end of an adjacent cartridge body 22. However, embodiments where the plurality of cartridge bodies 22 are formed with a first end 24 of a cartridge body 22 adjacent the second end 26 of another cartridge body 22 are also contemplated herein. Accordingly, the corrugated structure 66 output from the corrugator 64 includes a continuous chain of integrally formed cartridge bodies 22.

The corrugated structure 66 output from the corrugator 64 is then provided to a cutting mechanism 68, such as a rotary cutter, a planetary cutter, a core cutter, or a die cutter for example. Alternatively, the corrugated structure 66 may be collected on a device, such as a spool for example, to store the corrugated structure 66, prior to being supplied to the cutting mechanism 68. In an embodiment, the cutting mechanism 68 is operable to cut the corrugated structure 66 at intervals to form a plurality of individual cartridge bodies 22. As the cutting mechanism 68 divides the corrugated structure 66 into individual bodies 22, the cutting mechanism 68 may additionally remove excess material to form a finished cartridge body 22.

Alternatively, multiple cutting operations may be performed on the corrugated structure 66, by one or more cutting mechanisms 68, as shown in FIG. 7. For example, in embodiments where the corrugated structure 66 is continuous, the corrugated structure 66 may first be cut into a piece 70 of a desired length associated with a predetermined number of cartridge bodies 22. Once the piece 70 is formed, the piece 70 may then be rough cut to form a plurality of individual cartridge bodies 22. Each individual body may then be die cut to finish the edges of the plurality of cartridge bodies 22 and form a final cartridge body 22. However, it should be understood that in some embodiments, forming the individual cartridge bodies 22 and finishing the edges thereof to form a final cartridge body 22 may occur in a single cutting operation. The manufacturing process illustrated and described herein is intended as an example only, and other suitable processes are also within the scope of the disclosure.

Figure 8:
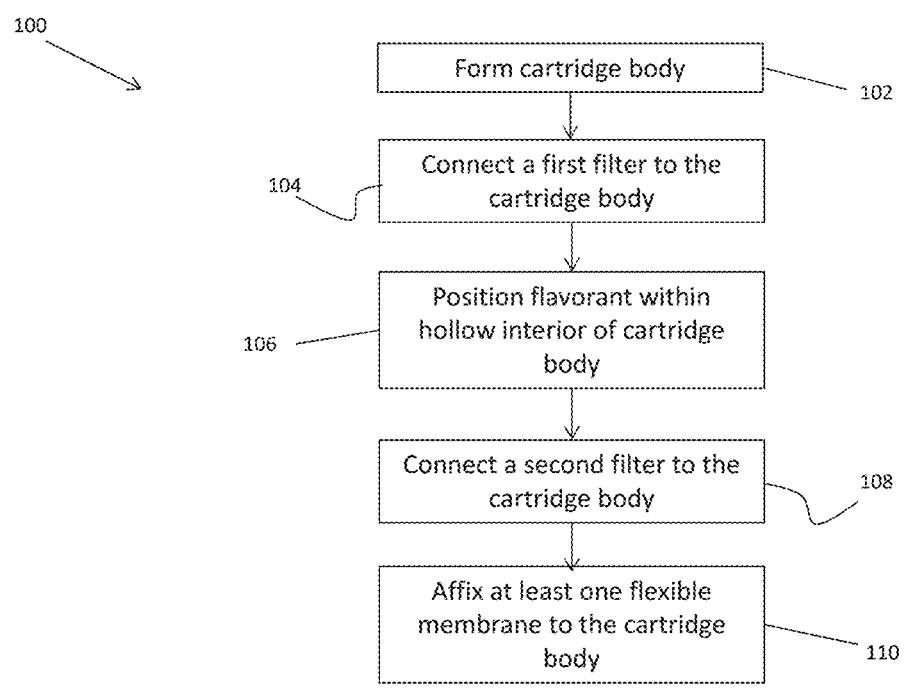
FIG. 8 is a method of manufacturing a cartridge for use with a beverage brewing system according to an embodiment.

With reference now to FIG. 8, a method of forming a cartridge 100 is illustrated. After formation of the cartridge body 22, illustrated at block 102, the first filter 36 is connected to the cartridge body 22, see block 104. A flavorant 44 is then positioned within the hollow interior 30 in overlapping arrangement with the first filter 26, as shown in block 106, and the second filter 38 is connected to the cartridge body 22 in block 108. The at least one flexible membrane 46 is then affixed to the cartridge body 22, shown in block 110, to form a barrier protecting the contents of the cartridge 20 from contamination. The method illustrated and described herein is intended as an example only.

A cartridge 20 having a cartridge body 22 with an opening 32, 34 formed in the first end 24 and the second end 26, respectively, as illustrated and described herein, provides benefit of enhance manufacturing ease and efficiency compared to conventional cartridges.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of manufacturing a cartridge for use in a beverage preparation system comprising:
    extruding a tubular structure;
    forming a plurality of cartridges from the tubular structure, each cartridge having a frustoconical shape corresponding to a shape for use in a beverage preparation system, each cartridge including a first open end having a flange extending inward toward a center of the cartridge and a second open end having a stepped flanged around a periphery of the cartridge and extending outward from the center of the cartridge;
    cutting the plurality of cartridges at intervals to separate the plurality of cartridges into individual cartridges; and
    connecting a filter to the first open end of an individual cartridge.

2. The method of claim 1, wherein extruding the tubular structure includes coextruding a composition including a plurality of layers.

3. The method of claim 2, wherein at least one of the plurality of layers includes ethylene vinyl alcohol.

4. The method of claim 2, wherein the plurality of stacked layers include an inner layer, an intermediate layer and an outer layer.

5. The method of claim 4, wherein an adhesive material is positioned between adjacent layers of the plurality of layers.

6. The method of claim 1, wherein forming the plurality of cartridges further comprises supplying the tubular structure to a corrugator to form the frustoconical shape.

7. The method of claim 1, wherein the frustoconical shape includes a contour associated with a sidewall of the cartridge.

8. The method of claim 7, wherein the plurality of cartridges further comprises Ran substantially identical first cartridge and second cartridge, and wherein the first open end of the first cartridge is arranged adjacent to the first open end of the second cartridge.

9. The method of claim 7, wherein the plurality of cartridges further comprises Ran substantially identical first cartridge and second cartridge, and wherein the first open end of the first cartridge is arranged adjacent to the second open end of the second cartridge.

10. The method of claim 1, wherein cutting the plurality of cartridges at intervals includes supplying the tubular structure to at least one cutting mechanism.

11. The method of claim 1, wherein cutting the plurality of cartridges at intervals further comprises removing excess material to form the individual cartridges.

12. The method of claim 1, wherein the tubular structure is continuously output from an extruder and each cartridge of the plurality of cartridges is continuously formed into the frustoconical shape.

13. The method of claim 1, wherein the method of manufacturing is a continuous process.

14. A method of manufacturing a cartridge for use in a beverage preparation system, the method comprising:
    extruding a tubular structure;
    forming a cartridge for use in a beverage preparation system, the cartridge having a frustoconical shape and a hollow center, a first open end having a flange extending inward toward the hollow center, a second open end having a stepped flange around a periphery of the cartridge and extending outward from the hollow center, and at least one side wall extending between the first open end and the second open end; and
    positioning a flavorant within the hollow center; and
    connecting a first filter to the first open end of the cartridge.

15. The method of claim 14, wherein extruding the tubular structure further comprises coextruding a plurality of layered materials.

16. The method of claim 15, wherein forming the cartridge further comprises forming the cartridge to have a circular cross-section.

17. The method of claim 16, wherein forming the cartridge further comprises supplying the tubular structure to a corrugator.

18. The method of claim 17, wherein the cartridge is formed from a plurality of integrally formed and adjacent cartridges formed from the tubular structure using the corrugator.

19. The method of claim 14, further comprising:
    attaching a second filter to the second open end of the cartridge.

20. The method of claim 14, further comprising affixing a flexible membrane to at least one of the first open end and the second open end.

* * * * *